(12) United States Patent
Peter et al.

(10) Patent No.: US 7,726,730 B2
(45) Date of Patent: Jun. 1, 2010

(54) PASSENGER SEAT DEVICE FOR MOTOR VEHICLES

(75) Inventors: Classen Peter, Russelsheim (DE); Hofer Carsten, Russelsheim (DE)

(73) Assignees: Hyundai Motor Company, Seoul (KR); Kia Motors Corporation, Seoul (KR); Hyundai Motor Europe Technical Center GmbH, Russelsheim (DE)

( * ) Notice: Subject to any disclaimer, the term of this patent is extended or adjusted under 35 U.S.C. 154(b) by 5 days.

(21) Appl. No.: 12/176,213

(22) Filed: Jul. 18, 2008

(65) Prior Publication Data

US 2009/0256405 A1 Oct. 15, 2009

(30) Foreign Application Priority Data

Apr. 9, 2008 (EP) .................. 08154258

(51) Int. Cl.
| B60N 2/04 | (2006.01) |
| B60N 2/06 | (2006.01) |
| B60N 2/07 | (2006.01) |
| B60N 2/24 | (2006.01) |
| B60N 2/30 | (2006.01) |
| B60R 22/00 | (2006.01) |
| A47C 7/62 | (2006.01) |

(52) U.S. Cl. .................. 297/92; 297/93; 297/112; 297/188.04; 297/234; 297/238; 297/483; 297/1; 296/65.13

(58) Field of Classification Search ............ 297/1, 297/92, 93, 94, 95, 484, 486, 112, 188.04, 297/234, 238, 483; 296/65.05, 65.13
See application file for complete search history.

(56) References Cited

U.S. PATENT DOCUMENTS

| 802,519 | A | | 10/1905 | Long | |
| 2,261,519 | A | * | 11/1941 | Jones | 297/65 |
| 2,858,880 | A | | 11/1958 | Fox | |
| 3,529,863 | A | * | 9/1970 | Belfry | 296/66 |
| 3,743,350 | A | * | 7/1973 | Allen | 297/94 |
| 3,955,846 | A | * | 5/1976 | Murphy | 297/93 X |
| 3,964,785 | A | * | 6/1976 | Plume | 297/64 |
| 4,541,654 | A | * | 9/1985 | Jonasson | 297/238 X |
| 4,779,917 | A | * | 10/1988 | Campbell et al. | 296/65.09 |
| 4,979,702 | A | | 12/1990 | Franklin | |
| 5,056,849 | A | | 10/1991 | Norris, Jr. et al. | |
| 5,076,643 | A | | 12/1991 | Colasanti et al. | |

(Continued)

FOREIGN PATENT DOCUMENTS

DE          1 127 936 B      4/1962

(Continued)

*Primary Examiner*—Rodney B White
*Assistant Examiner*—Patrick Lynch
(74) *Attorney, Agent, or Firm*—Morgan, Lewis & Bockius LLP

(57) ABSTRACT

A passenger seat for use in a motor vehicle includes a first and a second substantially planar region. The seat is pivotable about a horizontal axis between a first position and a second position. In the first position, the first region is horizontal and acts as the seat, and the second region is vertical and acts as the seat back, such that the passenger is facing forward. In the second position, the first region is vertical and acts as the seat back, and the second region is horizontal and acts as the seat, such that the passenger is facing backward.

6 Claims, 10 Drawing Sheets

U.S. PATENT DOCUMENTS

| | | | |
|---|---|---|---|
| 5,098,154 A * | 3/1992 | Emery | 297/92 |
| 5,806,891 A * | 9/1998 | Pokhis | 297/483 X |
| 6,273,810 B1 * | 8/2001 | Rhodes et al. | 454/120 |
| 7,144,085 B2 * | 12/2006 | Vits et al. | 297/483 |
| 7,156,442 B2 * | 1/2007 | McManus et al. | 296/65.09 |
| 2004/0183329 A1 | 9/2004 | Macey et al. | |
| 2008/0122279 A1 * | 5/2008 | Park | 297/332 |

FOREIGN PATENT DOCUMENTS

| | | |
|---|---|---|
| DE | 102 49 444 C1 | 11/2003 |
| FR | 2 710 012 A1 | 3/1995 |
| JP | 05-330367 | 12/1993 |
| JP | 2005-112319 | 4/2005 |
| KR | 1996-0009972 | 11/1996 |
| KR | 1997-36486 | 7/1997 |
| KR | 10-2007-0080750 | 8/2007 |
| SU | 1020360 A | 5/1983 |
| WO | WO 95/09095 A1 | 4/1995 |

\* cited by examiner

A - A'

A - A'

US 7,726,730 B2

PASSENGER SEAT DEVICE FOR MOTOR VEHICLES

CROSS-REFERENCE TO RELATED APPLICATION

This application claims priority to, and the benefit of, European Patent Application No. EP08154258.1, filed in the European Intellectual Property Office on Apr. 9, 2008, the entire contents of which are incorporated herein by reference.

BACKGROUND OF THE INVENTION (a) Field of the Invention

This invention relates to a passenger seat device for motor vehicles.

(b) Description of the Related Art

It is desirable, particularly in vehicles with three or more rows of seats, e.g. vans, for the passenger seats to be able to adopt several seat positions, e.g. forward-facing and backward-facing.

Passenger seats which can be rotated about a vertical axis of rotation to alter the seat position are generally known. However, this solution requires a great deal of lateral space because the seats are generally longer than they are wide.

The above information disclosed in this Background section is only for enhancement of understanding of the background of the invention and therefore it may contain information that does not form the prior art that is already known in this country to a person of ordinary skill in the art.

SUMMARY OF THE INVENTION

A passenger seat for use in a motor vehicle includes a first and a second substantially planar region. The seat is pivotable about a horizontal axis between a first position and a second position. In the first position, the first region is horizontal and acts as the seat, and the second region is vertical and acts as the seat back, such that the passenger is facing forward. In the second position, the first region is vertical and acts as the seat back, and the second region is horizontal and acts as the seat, such that the passenger is facing backward.

A bearing may pivotably mount the seat to the motor vehicle. The bearing may include two struts and a rail, slidably mounted in a corresponding rail on the floor of the motor vehicle. The struts may be mounted in the rail.

A cushion may be mounted in the seat and movable such that in the first position, the cushion extends beyond an end of the second region and lies substantially flush with an end of the first region, and in the second position, the cushion extends beyond the end of the first region and lies substantially flush with the end of the second region.

A headrest may be retractably mounted to an end of the each regions.

At least one air cushion may be provided on each of the regions such that an amount of cushioning of each region can be adjusted.

The seat may also include a seat belt reel device with a reelable seat belt at one side near where the regions meet, a first seat belt lock at another side near where the regions meet, a second seat belt lock near an end of the first region, and a third seat belt lock near an end of the second region. The seat belt may include first and second stop tongue parts each configured to be engaged in any of the seat belt locks.

The seat may also include a receiving device on at least one of the regions for receiving a corresponding engaging device of an additional seat.

DETAILED DESCRIPTION OF PREFERRED EMBODIMENTS

Figure 1:
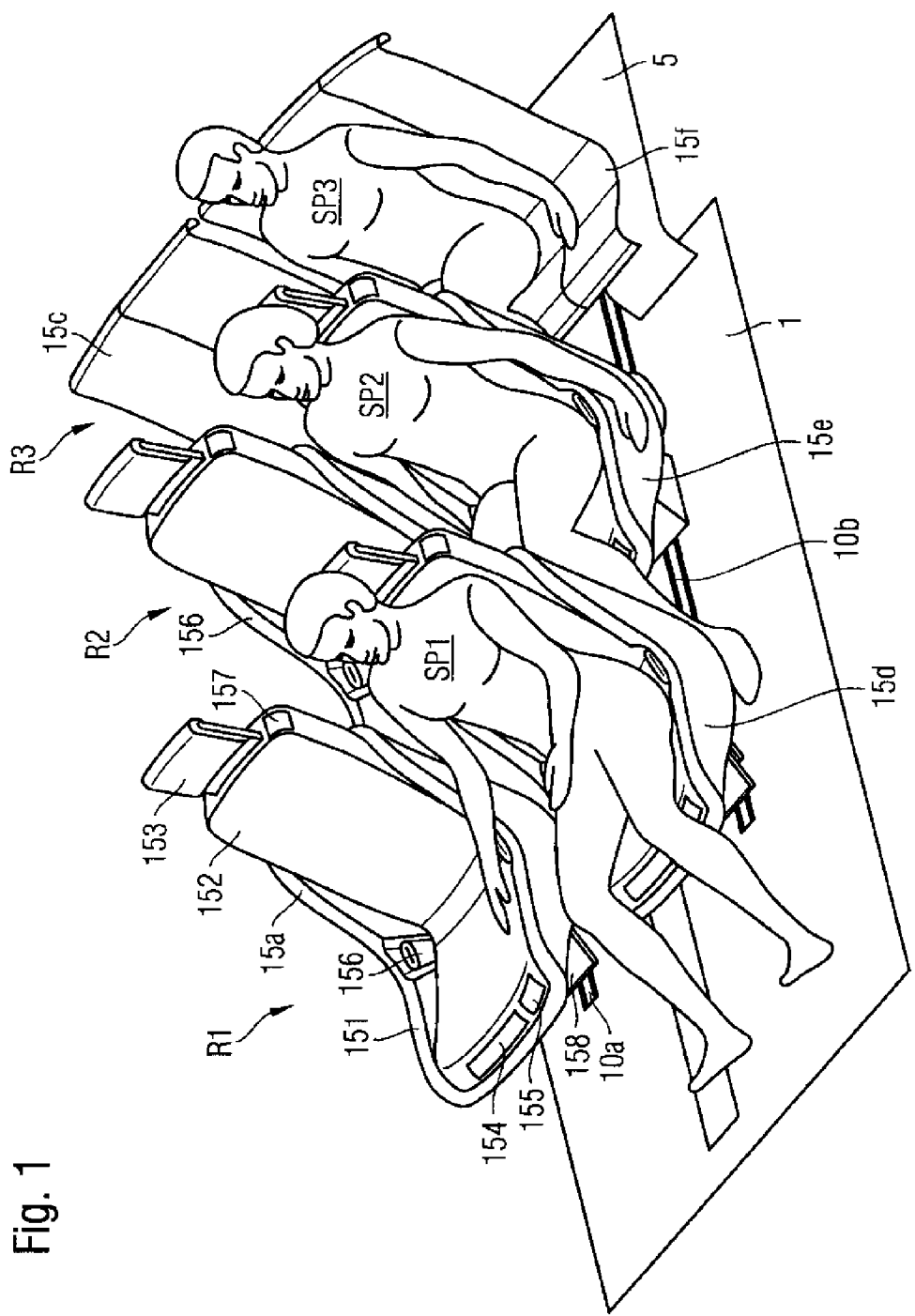
FIG. 1 is a schematic view of a motor vehicle seating arrangement according to an embodiment of this invention.

Exemplary embodiments of the invention are shown in the drawings and explained in greater detail in the following description.

In the figures the same reference symbols denote the same or functionally the same components.

In FIG. 1 reference symbol 1 denotes a floor carpet in a passenger compartment of a motor vehicle. The passenger compartment ends at a cargo compartment at platform 5. Parallel first and second rails 10a, 10b are attached to floor carpet 1. Displaceably mounted passenger seats 15a, 15b and 15d, 15e are provided in rails 10a, 10b, respectively. Passenger seats 15a, 15d are located in a first front seat row R1, and passenger seats 15b, 15e are located in a middle seat row R2. Two emergency seats 15c, 15f are fitted in a receiving device (to be explained later) in a rear seat row R3, which lies immediately in front of the cargo compartment. Emergency seats 15c, 15f are not displaceable. Reference symbols SP1, SP2, SP3 denote persons who are sitting on passenger seats 15d, 15e, 15f, respectively.

With reference to passenger seat 15a, some features which are also present in passenger seats 15b, 15d, 15e are explained in greater detail below, but for reasons of clarity these features are not denoted separately with reference symbols.

Passenger seat 15a has an outer seat shell 151 of plastic, in which an inner seat cushion device 152 is fitted. A headrest 153 is provided retractably in seat cushion device 152 in the head region. Reference symbol 154 denotes an additional headrest which is retracted in the seat cushion device 152 at the longitudinal end of the seat region of seat cushion device 152.

Reference symbols 155, 156, 157 each denote a seat belt lock whose functions are explained in more detail later. Finally, reference symbol 158 denotes a cover for a bearing device by means of which passenger seat 15a is mounted retractably in rail 10a.

Figure 2A:
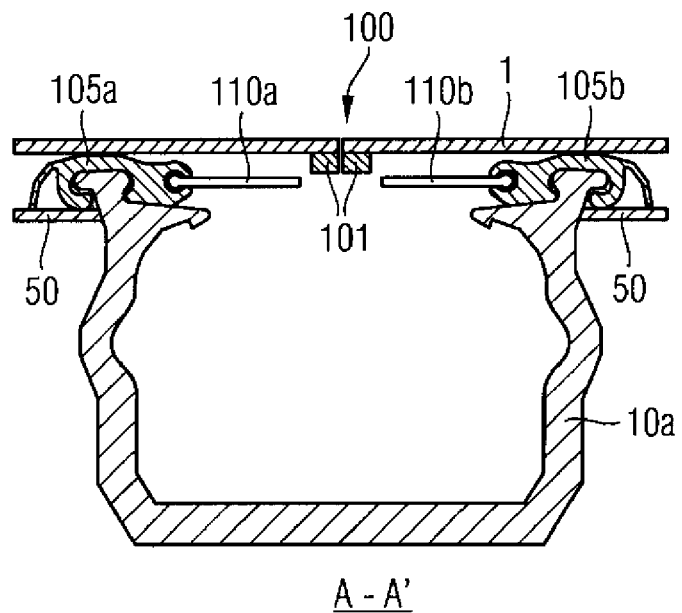
FIGS. 2a and 2b are cross-sectional views of a motor vehicle floor rail according to an embodiment of this invention.
Figure 2B:
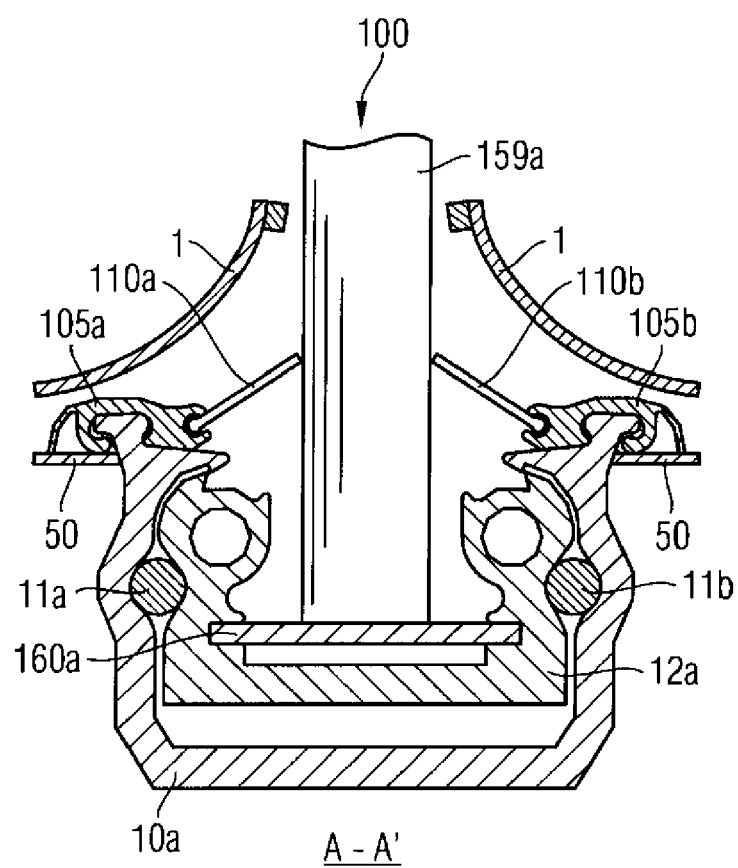

FIG. 2a shows rail 10a without a passenger seat inserted, whereas FIG. 2b shows how passenger seat 15a is inserted into rail 10a by means of a further rail 12a. It should be noted that rail 10a is illustrated in FIG. 1 such that runs continuously along the floor 1. This may stabilize the vehicle by increasing the rigidity of the floor 1, but other rails 10a are within the scope of the invention. For example, two shorter rails 10a, one for each seat 15a, 15b, may be provided.

As shown in FIG. 2a, rail 10a has an essentially U-shaped cross-section. Support devices 105a, 105b, on each of which is mounted a flap 110a, 110b, are provided on the upper sides of the each of the flanks of rail 10a. The flaps 110a, 110b run essentially parallel to the base of rail 10a in the condition without the passenger seat inserted (FIG. 2a).

Reference symbol 50 denotes a floor panel of the motor vehicle, into which rail 10a is inserted such that support devices 105a, 105b rest on floor panel 50.

Floor carpet 1, for example a plastic mat, has a gap 100 running longitudinally along the rail center, which gap is kept essentially closed by a magnet device 101 in the condition without the inserted passenger seat, so that floor does not curve.

As shown in FIG. 2b, the bearing device which supports the passenger seat in the motor vehicle has a second rail 12a which is inserted in first rail 10a so that it can be slid in the longitudinal direction. Roller bearings 11a, 11b are inserted between first rail 10a and second rail 12a to minimize friction. First and second supporting struts 159a, 159b (FIG. 3) are fitted on a horizontal swivel axis 160a, which is pivoted in second rail 12a. Struts 159a, 159b are connected to seat shell 151. When the seat 15a is inserted, supporting struts 159a, 159b force flaps 110a, 110b and floor 1 outwardly upwards in the region of rail 12a.

Figure 3:
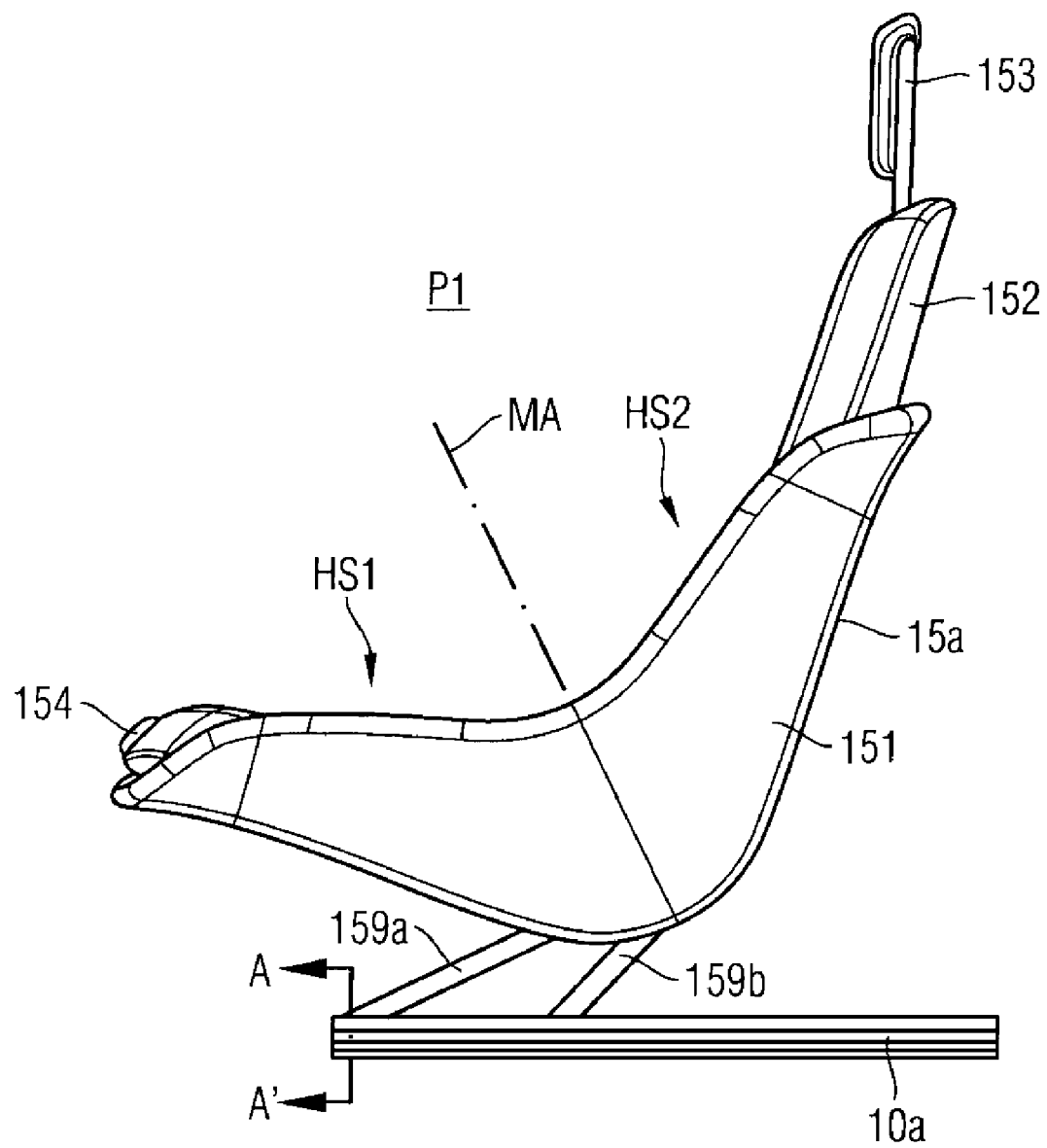
FIG. 3 is a side view of a seat according to an embodiment of this invention.

FIG. 3 illustrates the seat position P1 shown in FIG. 1, oriented in the forward-facing direction, with the struts 159a, 159b in a first angular position angled to the rear (to the right in FIG. 3). First and second supporting struts 159a, 159b run along swivel axes within seat shell 151 similar to those explained in relation to second rail 12a. The two supporting struts 159a, 159b thus assume the form of a four bar linkage.

In seat position P1 shown in FIG. 3, a stop (not shown) provided in the seat shell and in inner rail 12a prevents supporting struts 159a, 159b from being able to yield further to buckling in the backward direction. A change of angle in the forward direction is effected by a self-locking of a drive motor (not shown) installed preferably in passenger seat 15a. The motor swivels seat shell 151, and hence the entire passenger seat 15a, from seat position P1 to a seat position P5 oriented in the backward-facing direction, which is explained in detail below with reference to FIGS. 4a to e.

It should now be mentioned that seat shell 151 is shaped symmetrically about an axis of symmetry MA, and is divided into first and second half-shell regions HS1, HS2. Each half-shell region HS1, HS2 can serve either as a backrest region or as a seat region.

Turning now to FIGS. 4a-e, FIG. 4a corresponds to seat position P1, already explained with reference to FIG. 3. When the drive motor (not shown) is actuated, the angular position of supporting struts 159a, 159b changes.

Figure 4A:
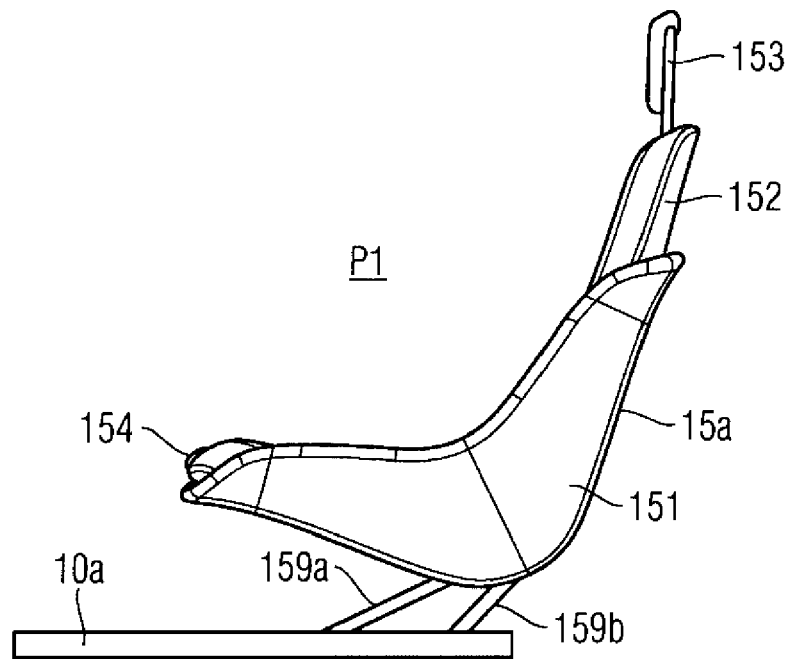
FIGS. 4a-4e are side views of a seat according to an embodiment of this invention in different swivel positions.
Figure 4B:
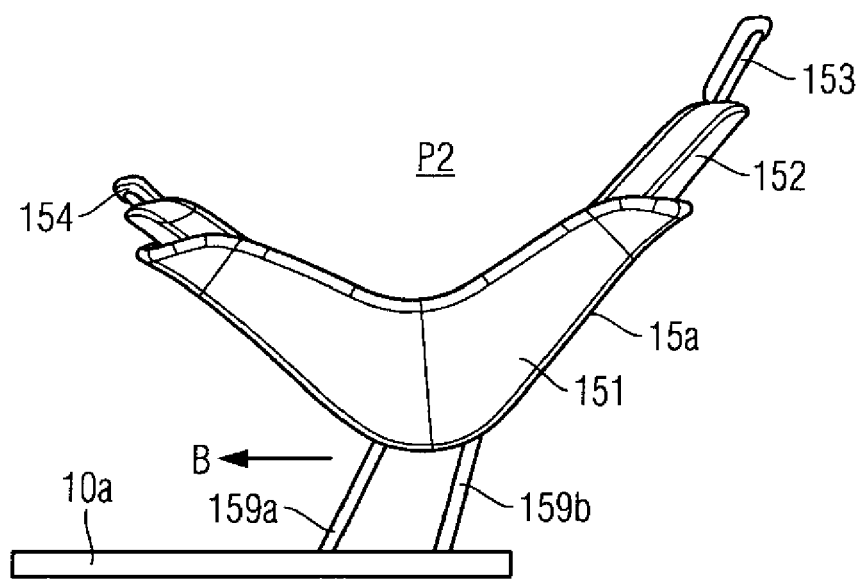

FIG. 4b shows an intermediate position P2, from which it can be seen that seat cushion device 152 is movable relative to seat shell 151, and that headrests 153, 154 can be adjusted relative to seat cushion device 152. The latter takes place by means of corresponding further drive motors or reduction gears which are coupled to the first drive motor.

Figure 4C:
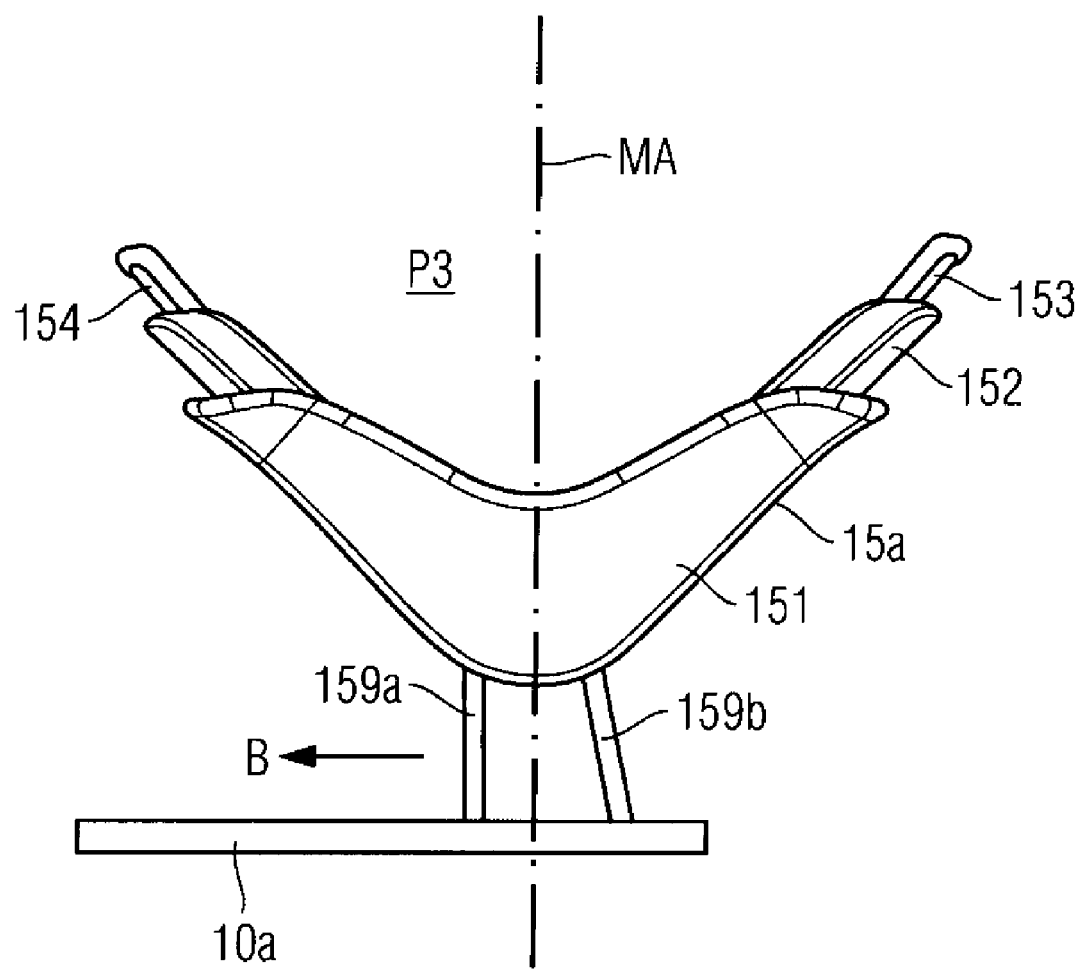

The representation in FIG. 4c shows the achievement of a central position P3, where seat shell 151 is tilted such that its axis of symmetry MA is perpendicular to rail 10a. In this position, headrest 153 is further retracted in seat cushion device 152 and headrest 154 is further extended from seat cushion device 152, compared to position P2. Moreover, seat cushion device 152 is further to the left side of seat shell 151.

Figure 4D:
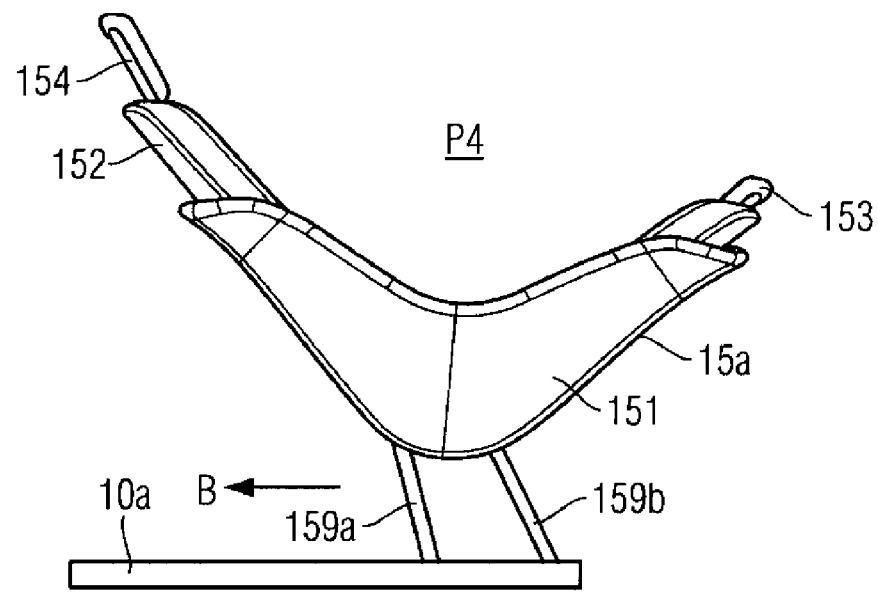

An intermediate position P4, which is a mirror image of seat position P2, is shown in FIG. 4d. Supporting struts 159a, 159b are now being angled forward.

Figure 4E:
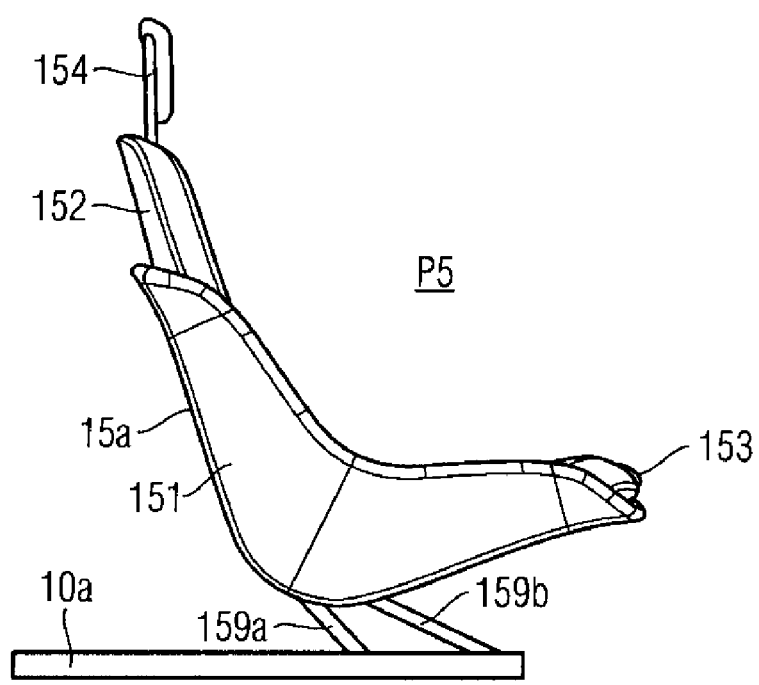

Finally, with reference to FIG. 4e, seat position P5, which is oriented in the backward-facing direction, is reached. In this seat position P5 the backrest region and the seat region have been swapped in comparison to seat position P1.

Furthermore, headrest 153 is fully retracted and headrest 154 is fully extended in seat position P5. Moreover, seat cushion device 152 lies essentially flush with seat shell 151 in the new seat region in the longitudinal direction (bottom right in the Figure), whereas seat cushion device 152 projects from seat shell 151 in the new backrest region (top left).

Similar to seat position P1, a stop (not shown) is provided in seat shell 151 and in rail 12a for supporting struts 159a, 159b, which stop prevents supporting struts 159a, 159b from buckling further in the forward direction. Backward buckling in the backward direction, for example due to vibration, is prevented by the self-locking of the drive motor (not shown).

It should be mentioned that unintentional actuation of the swivel mechanism of passenger seat 15a, 15b, 15d or 15e can be prevented by providing a detector, such as a weight sensor, which deactivates the drive motor as long as the passenger seat concerned is occupied.

It should also be mentioned that the displacement of seat cushion device 152 relative to seat shell 151 is in this example can be achieved by means of suitable rails (not shown) between seat shell 151 and seat cushion device 152.

Figure 5A:
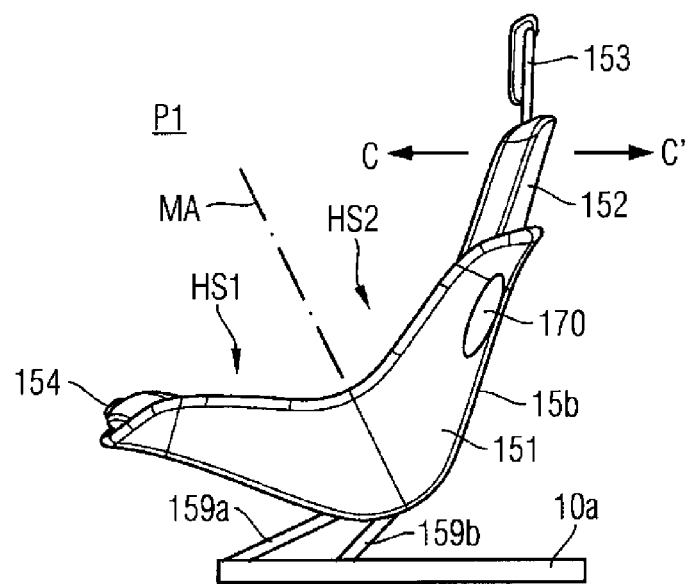
FIGS. 5a and 5b are a side view and a perspective view, respectively, of a seat according to an embodiment of this invention in different swivel positions.
Figure 5B:
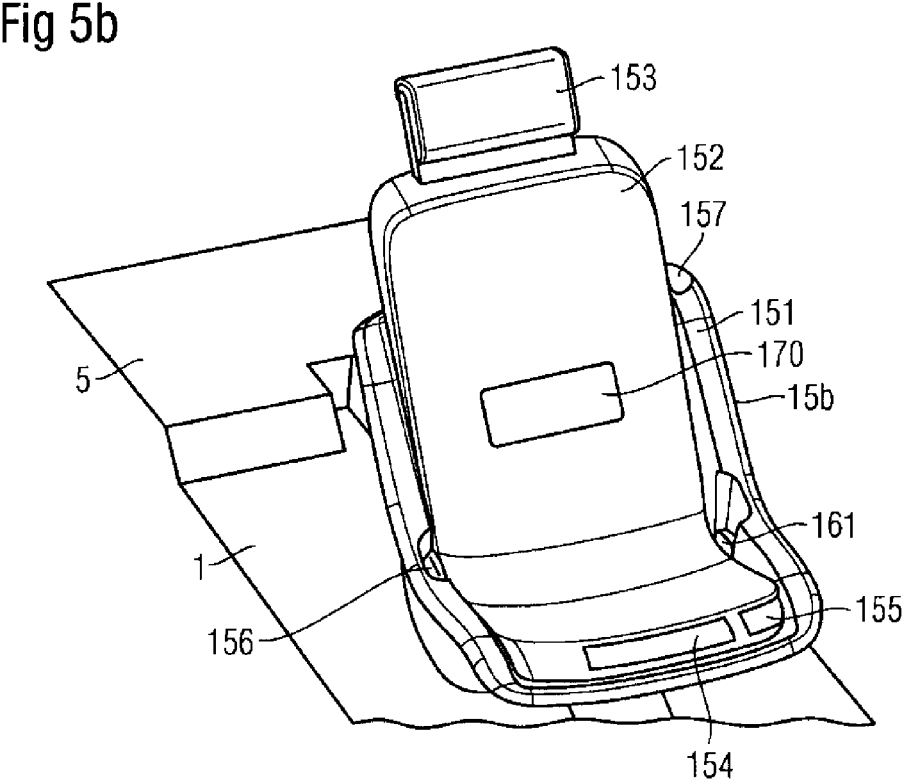

A backrest adjustment mechanism will now be described with reference to FIGS. 5a, 5b. An air cushion pad 170 is provided between seat shell 151 and seat cushion device 152. The pad 170 enables a distance between seat shell 151 and seat cushion device 152 to be changed in the region of air cushion pad 170. In seat position P1 shown in FIGS. 5a, 5b, this effects a displacement of seat cushion 152 in forward direction C and backward direction C', thereby providing a user-specific adjustment.

Another air cushion pad 170 is provided in the other half shell. More air cushion pads may be provided in further locations between seat shell 151 and seat cushion device 152, thereby effecting a fine adjustment to the contours of the sitting person.

Air cushion pad 170 can be actuated by means of a suitable air compressor (not shown).

Figure 6A:
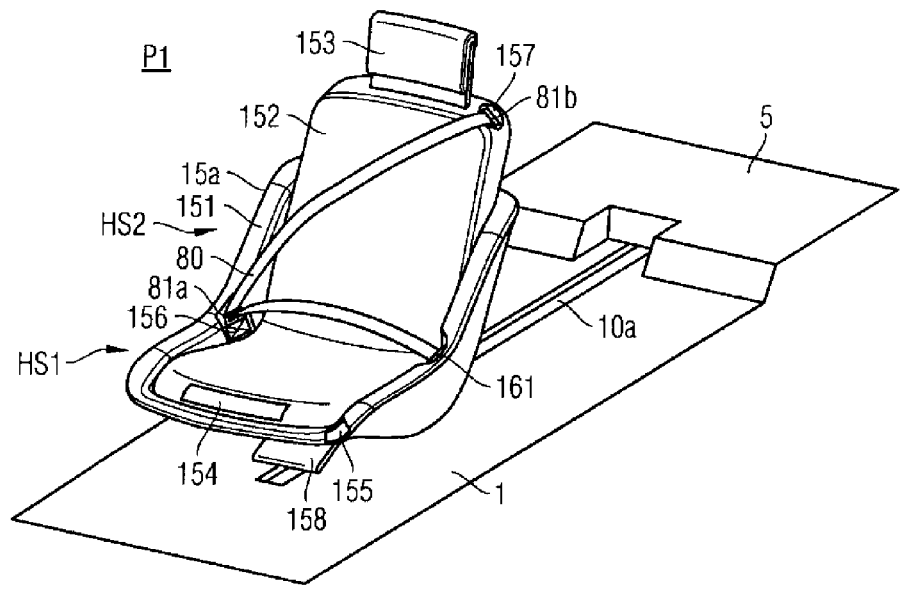
FIG. 6a is a perspective view of a motor vehicle seating arrangement according to an embodiment of this invention.

A seat belt mechanism will now be described with reference to FIGS. 6a, 6b. In the pelvic region of seat shell 151, on the left side of seat 15a is a safety reel device 161, with a reelable seat belt 80. On the right side is a first seat belt lock 156. A second seat belt lock 155 is provided at the longitudinal end of first half-shell region HS1, and a third seat belt lock 157 is provided at the longitudinal end of second half-shell region HS2, on the left side of seat shell 151. Seat belt locks 155, 156, 157 and seat belt reel device 161 are integral to seat shell 151.

Figure 6B:
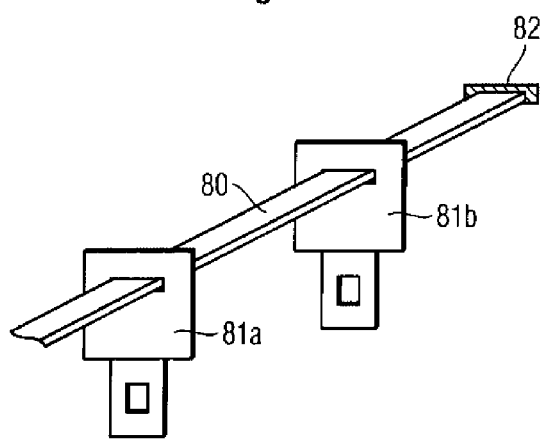
FIG. 6b is a partial perspective view of a seat belt according to an embodiment of this invention.

With reference to FIG. 6b, two stop tongue parts 81a, 81b are provided one behind the other on one belt end 82 of seat belt 80 projecting from seat belt reel device 161. In seat position P1 shown in FIG. 6a, seat belt 80 is first reeled completely in seat belt reel device 161, only belt end 82 and the two stop tongue parts 81a, 81b projecting from it.

For fastening the belt in seat position P1, the user first locks stop tongue part 81a in seat belt lock 156, then stop tongue part 81b in seat belt lock 157. This therefore provides the normal three-point fastening. To release the belt the user merely releases seat belt lock 156, seat belt lock 157 remaining locked as long as seat position P1 is maintained.

If a change in position is attained by swiveling from seat position P1 to seat position P5, both seat belt locks 156 and 157 are released, and the belt is again reeled completely in seat belt reel device 161.

When seat position P5 is reached, stop tongue part 81a is again locked in seat belt lock 156, but in this seat position stop tongue part 81b is locked in seat belt lock 155.

It should be noted that automatic release of seat belt lock 155 or 157 could be provided in the case of swiveling passenger seat 15a from seat position P1 to seat position P5.

Figure 7A:
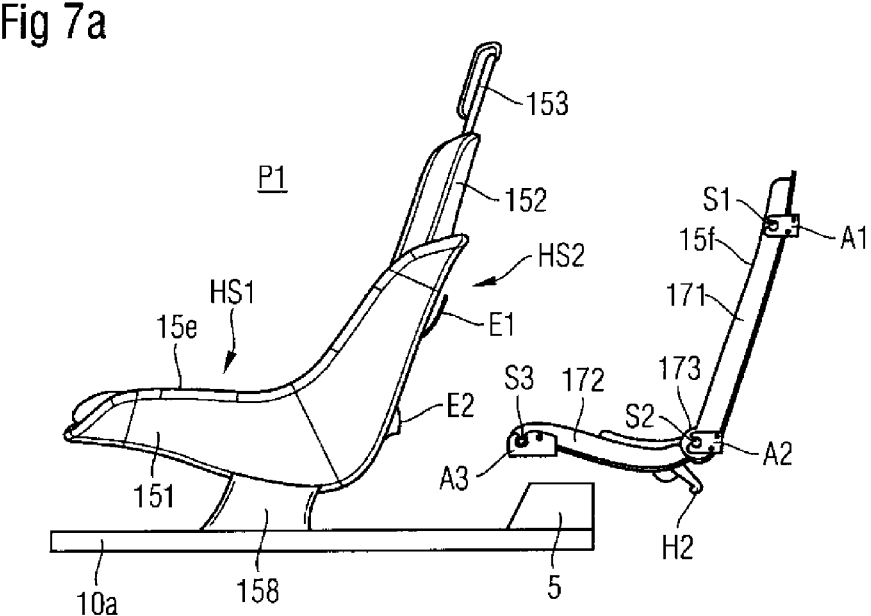
FIGS. 7a-7d are side views of a seat according to an embodiment of this invention.

An emergency seat displacement mechanism will now be described with reference to FIGS. 7a-7d. FIG. 7a shows passenger seat 15e in seat position P1, i.e. oriented in the forward direction. Reference symbols E1, E2 denote a receiving device provided on the rear side of half-shell HS2, e.g. lugs, pockets or hooks, for receiving a corresponding engaging device H1, H2, e.g. hooks on the lower side of a seat part 172 of emergency seat 15f, seat part 172 being connected by a joint 173 to rear part 171 so that it folds.

Also with regard to FIG. 7a, reference symbols A1, A2, A3 each denotes a locking element receiving device connected to the vehicle body (not shown). Stop elements S1, S2, S3, e.g. pins or noses, attached to emergency seat 15f, are locked to locking element receiving devices A1, A2, A3, as shown in FIG. 7a, so that emergency seat 15f is stably mounted.

If a user wishes to remove emergency seat 15f from platform 5, to enlarge the cargo space, for example, this can be achieved as follows.

Figure 7B:
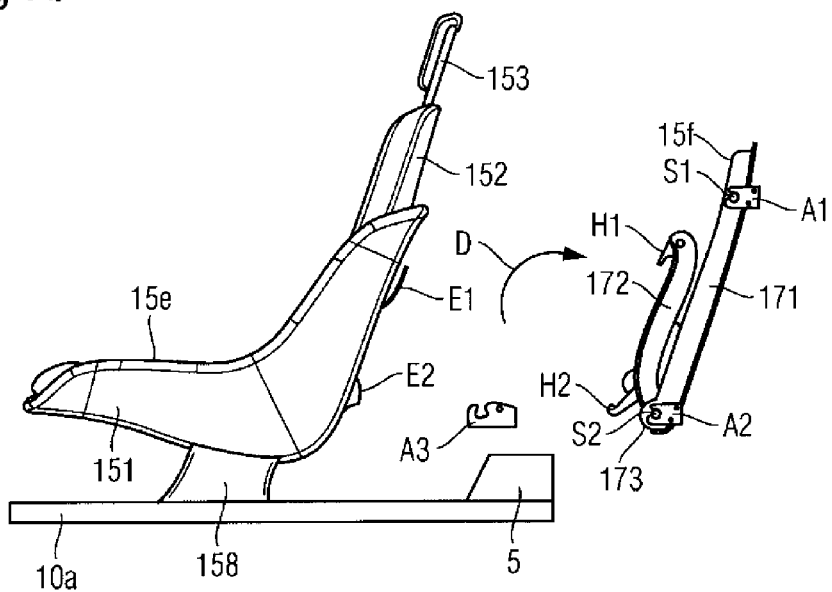

The user folds seat part 172 of emergency seat 15f up, as illustrated by arrow D in FIG. 7b. In this case stop element S2 is released from locking element receiving device A3, as shown in FIG. 7b.

Figure 7C:
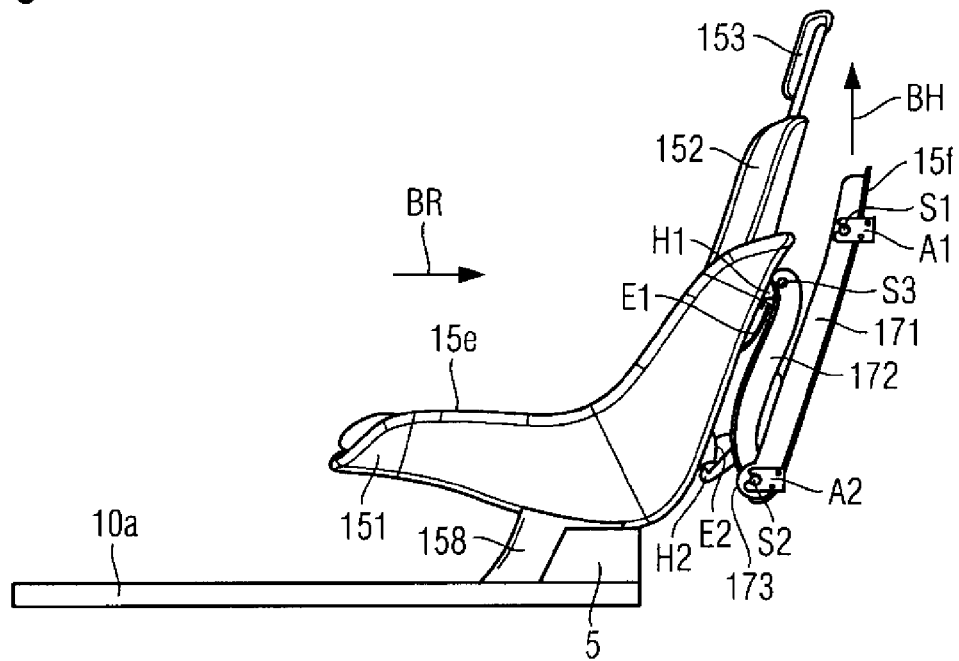
Figure 7D:
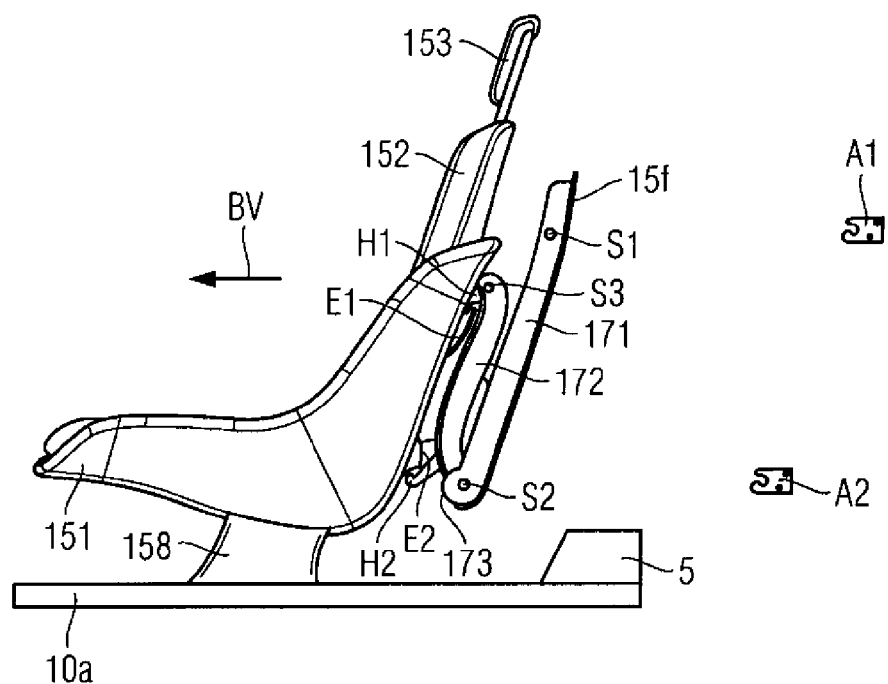

Then, as shown in FIG. 7c, passenger seat 15e is moved along rail 10a by means of a drive (not shown) in backward direction BR until receiving devices E1, E2 have received engaging devices such as hooks H1, H2 on the lower side of seat part 172 of emergency seat 15f, so that they lock.

In connection with FIG. 7c, this locked position between receiving device E1, E2 and engaging device H1, H2 is shown. Furthermore, receiving devices E1, E2 are vertically adjustable on the rear of seat shell 152 of passenger seat 15e, so that the locked emergency seat 15f can be raised in direction BH and stop elements S1, S2 can therefore be removed from locking element receiving devices A1, A2 by moving passenger seat 15e forward in forward direction BV after leaving the locking position. Emergency seat 15f is therefore removed from platform 5 and the loading space is correspondingly enlarged.

To re-install emergency seat 15f in its receiving devices A1, A2, A3, the steps described above are carried out in reverse.

While this invention has been described in connection with what is presently considered to be practical exemplary embodiments, it is to be understood that the invention is not limited to the disclosed embodiments. On the contrary, it is intended to cover various modifications and equivalent arrangements included within the spirit and scope of the appended claims.

What is claimed is:

1. A passenger seat for use in a motor vehicle, comprising:
    seat comprising a first substantially planar region and a second substantially planar region, wherein the seat is pivotable about a substantially horizontal axis between a first position and a second position, wherein, in the first position, the first region is substantially horizontal and the second region is substantially vertical, and in the second position, the first region is substantially vertical and the second region is substantially horizontal, and
    seat belt reel device with a reelable seat belt at one side of the seat near where the regions meet, a first seat belt lock at another side of the seat near where the regions meet, a second seat belt lock near an end of the first region, and a third seat belt lock near an end of the second region, wherein the end of the first region is spaced on the first region with a predetermined distance from where the regions meet and the end of the second region is spaced on the second region with a predetermined distance from where the regions meet and the seat belt comprises first and second stop tongue parts each configured to be engaged in any of the seat belt locks.

2. The passenger seat according to claim 1, further comprising a bearing configured to pivotably mount the seat to the motor vehicle, wherein the bearing comprises two struts.

3. The passenger seat according to claim 2, wherein the bearing further comprises a rail configured to be slidably mounted in a corresponding rail on a floor of the motor vehicle, wherein the struts are mounted in the corresponding rail of the floor.

4. The passenger seat according to claim 1, further comprising first and second headrests retractably mounted to ends of the first and second regions, respectively.

5. The passenger seat according to claim 1, further comprising at least one air cushion on each of the regions such that an amount of cushioning of each region can be adjusted.

6. The passenger seat according to claim 1, further comprising a receiving device on at least one of the regions for receiving a corresponding engaging device of an additional seat.

* * * * *